(12) United States Patent
Kampl et al.

(10) Patent No.: US 10,966,523 B2
(45) Date of Patent: Apr. 6, 2021

(54) CONNECTING ROD FOR FURNITURE PARTS

(71) Applicant: Julius Blum GmbH, Hoechst (AT)

(72) Inventors: Markus Kampl, Dornbirn (AT); Markus Irgang, Altach (AT); Gerald Sperger, Hard (AT); Guenter Schwarzmann, Dornbirn (AT)

(73) Assignee: Julius Blum GmbH, Hoechst (AT)

( * ) Notice: Subject to any disclaimer, the term of this patent is extended or adjusted under 35 U.S.C. 154(b) by 0 days.

(21) Appl. No.: 16/521,151

(22) Filed: Jul. 24, 2019

(65) Prior Publication Data

US 2019/0343279 A1 Nov. 14, 2019

Related U.S. Application Data

(63) Continuation of application No. PCT/AT2018/060034, filed on Feb. 8, 2018.

(30) Foreign Application Priority Data

Feb. 21, 2017 (AT) .............................. A 50137/2017

(51) Int. Cl.
*A47B 88/90* (2017.01)
*F16B 12/24* (2006.01)
*F16B 12/46* (2006.01)

(52) U.S. Cl.
CPC ............ *A47B 88/941* (2017.01); *F16B 12/24* (2013.01); *F16B 12/46* (2013.01)

(58) Field of Classification Search
CPC ................ F16B 12/12; F16B 2012/103; F16B 2012/145; F16B 12/14; F16B 12/16;
(Continued)

(56) References Cited

U.S. PATENT DOCUMENTS

| 4,582,446 A | 4/1986 | Salice |
|---|---|---|
| 4,886,326 A | 12/1989 | Kuzyk |

(Continued)

FOREIGN PATENT DOCUMENTS

| AT | 521512 | * | 2/2020 |
|---|---|---|---|
| CN | 201534973 | | 7/2010 |

(Continued)

OTHER PUBLICATIONS

Translation of FR1574425 (Year: 1969).*

(Continued)

*Primary Examiner* — Janet M Wilkens
(74) *Attorney, Agent, or Firm* — Wenderoth, Lind & Ponack, L.L.P.

(57) ABSTRACT

A connecting pin for fastening a first furniture part to a second furniture part, includes a fastening portion for fastening the connecting pin to the first furniture part, and a holding portion for connecting the connecting pin to the second furniture part. The holding portion of the connecting pin includes a connecting portion facing the fastening portion, the connecting portion being a protrusion or a recess for connecting the second furniture part to the connecting pin in a form-locking manner. A head portion is spaced from the connecting portion along a longitudinal direction of the connecting pin by a neck portion. In a condition in which the connecting pin is fixed to the first furniture part via the fastening portion, at least two different second furniture parts can be alternatively connected to the connecting pin by the connecting portion in a form-locking manner and/or by the head portion in a force-locking manner.

17 Claims, 7 Drawing Sheets

(58) Field of Classification Search
CPC .......... F16B 12/24; F16B 12/30; F16B 12/36;
F16B 12/46; A47B 88/94; A47B 88/95;
A47B 2088/951–955
USPC .... 411/400, 401, 396, 55; 312/330.1, 348.1,
312/348.2, 348.4
See application file for complete search history.

(56) References Cited

U.S. PATENT DOCUMENTS

| | | | |
|---|---|---|---|
| 4,984,929 A | | 1/1991 | Röck et al. |
| 5,403,109 A | * | 4/1995 | Johnson ................ F16B 5/0092 403/231 |
| 5,540,515 A | | 7/1996 | Röck et al. |
| 5,567,081 A | * | 10/1996 | Vallance ............. F16B 12/2036 403/231 |
| 5,611,637 A | | 3/1997 | Brüstle et al. |
| 6,120,226 A | * | 9/2000 | Egger .................... A47B 88/00 411/48 |
| 9,161,624 B2 | * | 10/2015 | Haemmerle ......... A47B 88/427 |
| D799,313 S | * | 10/2017 | von Wilcke .................... D8/393 |
| D887,259 S | * | 6/2020 | Schwarzmann .............. D8/387 |
| D887,825 S | * | 6/2020 | Schwarzmann .............. D8/387 |
| 2007/0160418 A1 | * | 7/2007 | Lo .......................... F16B 12/24 403/275 |
| 2016/0316910 A1 | * | 11/2016 | Karu ..................... A47B 88/95 |
| 2018/0266473 A1 | * | 9/2018 | Campbell ............. B25B 15/005 |

FOREIGN PATENT DOCUMENTS

| | | | |
|---|---|---|---|
| CN | 104895888 | | 9/2015 |
| DE | 25 46 749 | | 4/1977 |
| DE | 295 18 690 | | 3/1996 |
| DE | 102 29 300 | | 3/2004 |
| DE | 20 2009 012 750 | | 3/2011 |
| DE | 20 2016 101 285 | | 4/2016 |
| DE | 102015110561 | * | 1/2017 |
| DE | 202015008847 | * | 3/2017 |
| DE | 202017102763 | * | 7/2017 |
| DE | 202017003832 | * | 10/2018 |
| EP | 0 698 357 | | 2/1996 |
| EP | 0 740 917 | | 11/1996 |
| EP | 1 516 561 | | 3/2005 |
| EP | 2 868 228 | | 5/2015 |
| EP | 3401556 | * | 1/2020 |
| FR | 1574425 | * | 7/1969 |
| FR | 2106883 | | 5/1972 |
| FR | 2559557 | * | 8/1985 |
| JP | 58-50308 | | 3/1983 |
| JP | 58-151705 | | 10/1983 |
| JP | 59-20012 | | 2/1984 |
| JP | 63-159538 | | 10/1988 |
| JP | 8-74822 | | 3/1996 |
| JP | 2002-106525 | | 4/2002 |
| JP | 2015-523122 | | 8/2015 |
| WO | 95/17611 | | 6/1995 |
| WO | 2019119002 | * | 6/2019 |
| WO | 2019119003 | * | 6/2019 |
| WO | 2020069542 | * | 4/2020 |

OTHER PUBLICATIONS

International Search Report dated May 28, 2018 in International (PCT) Application No. PCT/AT2018/060034.
English translation of Search Report dated Nov. 29, 2018 in Taiwanese Application No. 107105717.
English Translation of Search Report dated Nov. 4, 2020 in Chinese Patent Application No. 201880012742.2.

* cited by examiner

CONNECTING ROD FOR FURNITURE PARTS

BACKGROUND OF THE INVENTION

The present invention relates to a connecting pin for fastening a first furniture part to a second furniture part. The connecting pin includes a fastening portion for fastening the connecting pin to the first furniture part, and a holding portion for connecting the connecting pin to the second furniture part.

The invention further relates to an arrangement including a first furniture part in the form of a front panel and/or a second furniture part in the form of a drawer strut and/or a drawer wall and/or a wall element set onto the drawer wall, and a connecting pin of the type to be described.

Moreover, the invention relates a drawer set including a connecting pin, a first drawer wall and/or a drawer strut and/or a second drawer wall having a height being less than a height of the first drawer wall, in which a wall element is set onto the second drawer wall.

DE 20 2016 101 285 U1 to the applicant shows a device for mounting a furniture fitting to a furniture part, in which a pin is configured to be pre-mounted to the furniture part and the furniture fitting is configured to be locked to the pre-mounted pin by a locking device.

DE 102 29 300 B3 discloses a connecting system for furniture parts, and the connecting system includes a socket, a dowel to be releasably connected to the socket, and an expansion body for expanding the dowel. The socket is thereby to be inserted into a first bore of a first furniture part, and a tapered neck portion of the dowel can be pushed into a recess of the socket, whereby the socket can be arrested in the first bore. Moreover, the dowel can be introduced into a second bore of the second furniture part and can be expanded in that second bore by the expanding dowel, so that altogether a fixed connection between the two furniture parts can be established.

SUMMARY OF THE INVENTION

It is an object of the invention to propose a connecting pin of the type mentioned in the introductory part, suitable for various implementation possibilities.

According to the invention, the holding portion of the connecting pin includes a connecting portion facing towards the fastening portion, the connecting portion being in the form of a protrusion or a recess for connecting the second furniture part to the connecting pin in a form-locking manner, and a head portion spaced in a longitudinal direction of the connecting pin by a neck portion. In a condition in which the connecting pin is fixed to the first furniture part via the fastening portion, at least two different second furniture parts can be alternatively connected to the connecting pin by the connecting portion in a form-locking manner and/or by the head portion in a force-locking manner.

By the proposed connecting pin with the connecting portion and the head portion, it is thus possible to connect at least two furniture parts having a different configuration, for example a first drawer wall, a drawer strut and/or a wall element set onto the second drawer wall, alternatively in a form-locking manner and/or in a force-locking manner to a first drawer wall, for example in the form of a front panel.

Accordingly, the connecting portion of the connecting pin can include at least one protrusion or at least one recess by which a form-locking connection between the connecting pin and the second furniture part can be established with the aid of a cooperating counter-contour of the second furniture part. If appropriate, the form-locking connection can also be established with the aid of a further component. The form-locking connection can be also secured by a force of a spring element, whereby the load-capacity of the form-locking connection can be additionally increased.

BRIEF DESCRIPTION OF THE DRAWINGS

Further details and advantages of the invention result from the embodiments shown in the drawings, in which.

DETAILED DESCRIPTION OF THE INVENTION

Figure 1A:
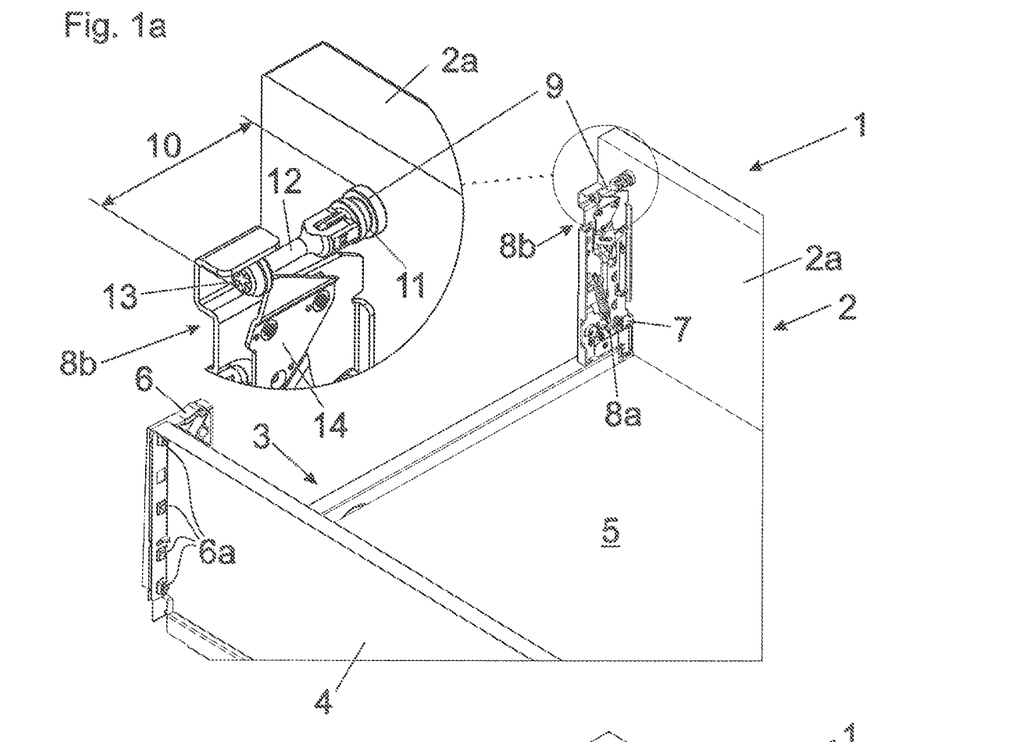
FIGS. 1a, 1b show a partial section of a first drawer in two perspective views from above.

FIG. 1a shows a partial section of a first drawer 1 having a drawer bottom 5, a first furniture part 2 in the form of a front panel 2a, a second furniture part 3 in the form of a drawer wall 3a and a rear wall 4. The drawer wall 3a is configured as a hollow-chamber profile having an inner profiled wall and an outer profiled wall, and the hollow-chamber profile is hidden in FIG. 1a for the sake of improved visualization. The drawer wall 3a includes a rear wall retainer 6 having protrusions 6a engaging into corresponding openings 16 (FIG. 3a) of the rear wall 4 in the mounted condition. Moreover, the drawer wall 3a includes a first fastening device 8a configured to be releasably locked to a holding portion 7 to be fixed to the front panel 2a, as already known from EP 0 740 917 A1. The drawer wall 3a further includes a second fastening device 8b which, in the mounted position, adopts a greater height than the first fastening device 8a. The second fastening device 8b is configured to be connected to a connecting pin 9 in a form-locking and/or in a force-locking manner, and the connecting pin 9 is to be fixed and pre-mounted to the front panel 2a.

Figure 4:
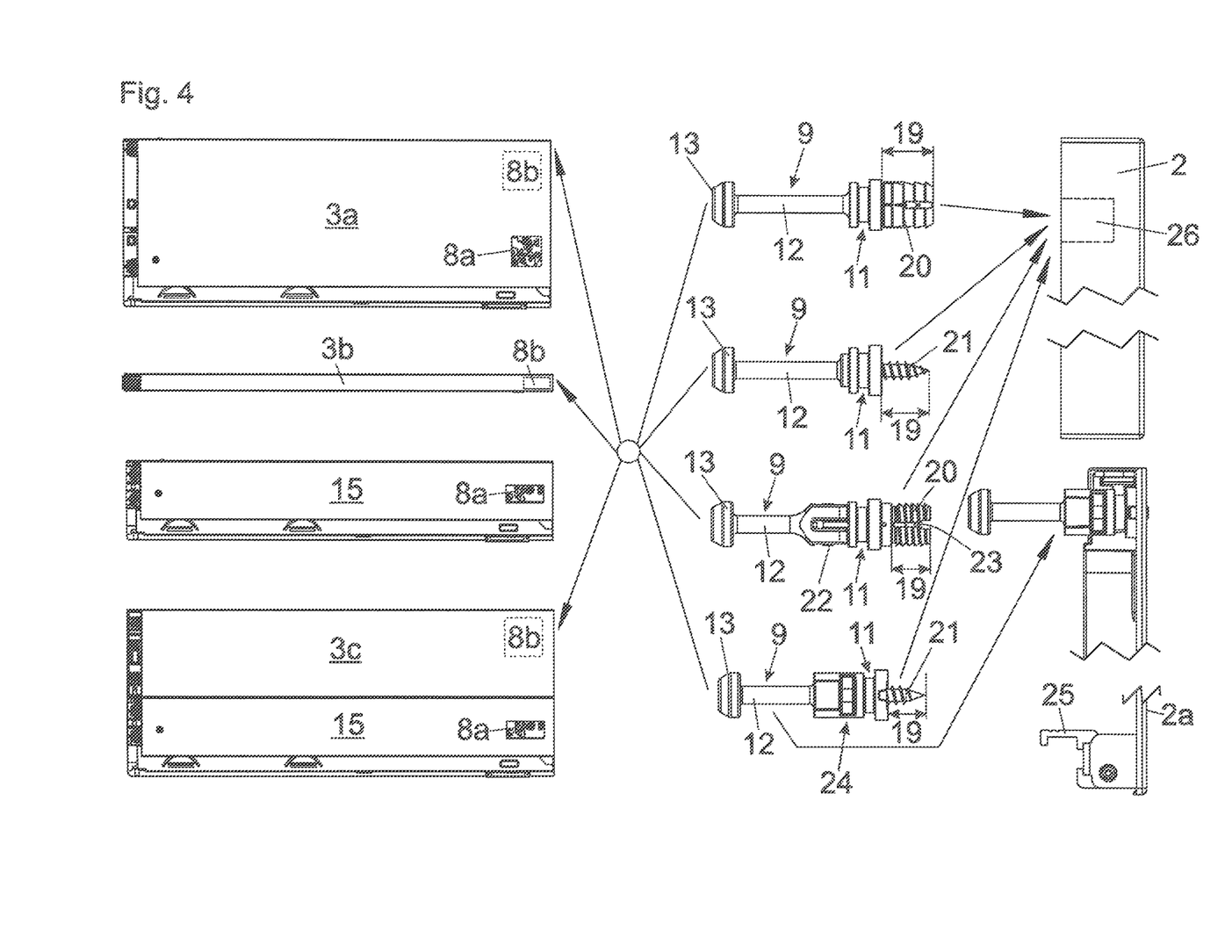
FIG. 4 shows a view of different second furniture parts and of different connecting pins.

The region encircled in FIG. 1a is shown laterally beside in an enlarged view. The connecting pin 9 is to be mounted to the rear side of the front panel 2a by a fastening portion 19 (FIG. 4). The connecting pin 9 includes a holding portion 10 comprising a connecting portion 11 and a head portion 13 connected by a neck portion 12. With this embodiment, the connecting portion 11 is not in use. The head portion 13 of the connecting pin 9 is, on the contrary, locked by at least one movably supported locking element 14 of the second fastening device 8b in a form-locking manner and/or in a force-locking manner, so that the front panel 2a—in addition to the fixation by the (lower) first fastening device 8a which is locked to the holding portion 7 pre-mounted to the front panel 2a—is connected to the drawer wall 3a.

Figure 1B:
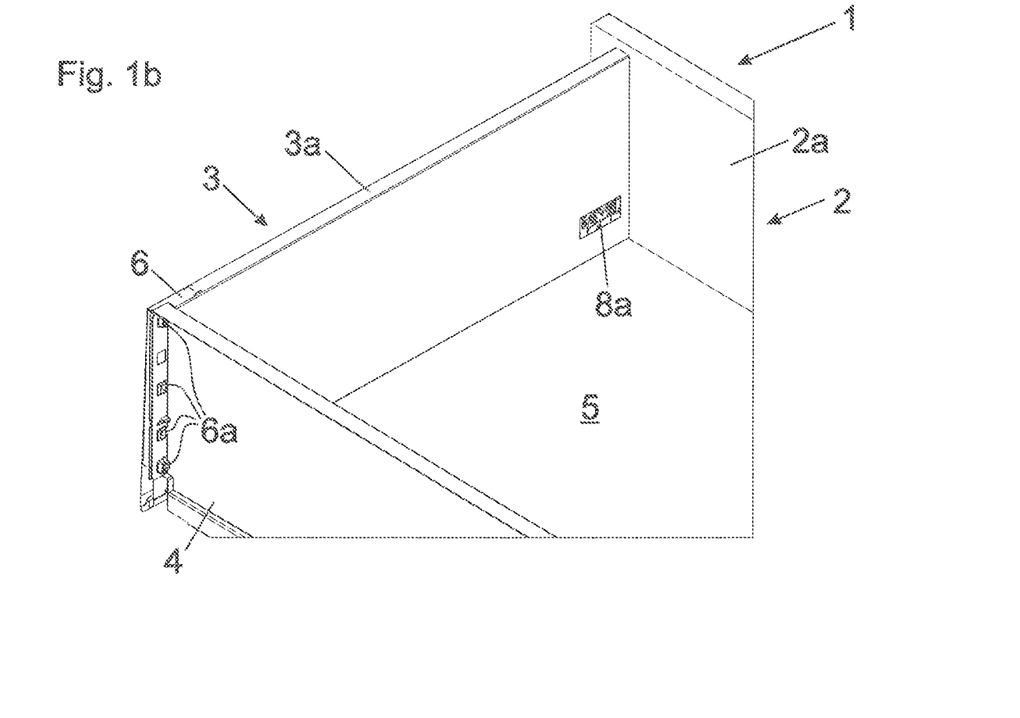

FIG. 1b shows the embodiment of the drawer 1 according to FIG. 1a, in which the drawer wall 3a configured as a hollow-chamber profile is displayed. The drawer wall 3a can have a substantially identical height as the rear wall 4. Accordingly, the drawer wall 3a has a relatively large height, whereby the loading capacity of the drawer 1 can be enlarged.

Figure 2A:
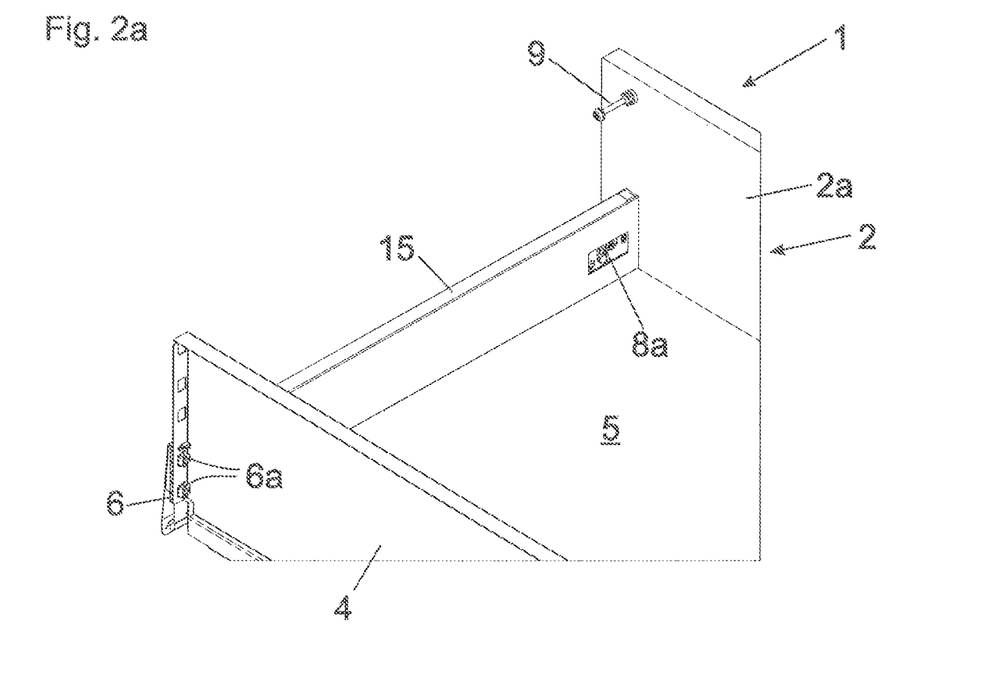
FIGS. 2a, 2b show a partial section of a second drawer in two perspective views from above.
Figure 2B:
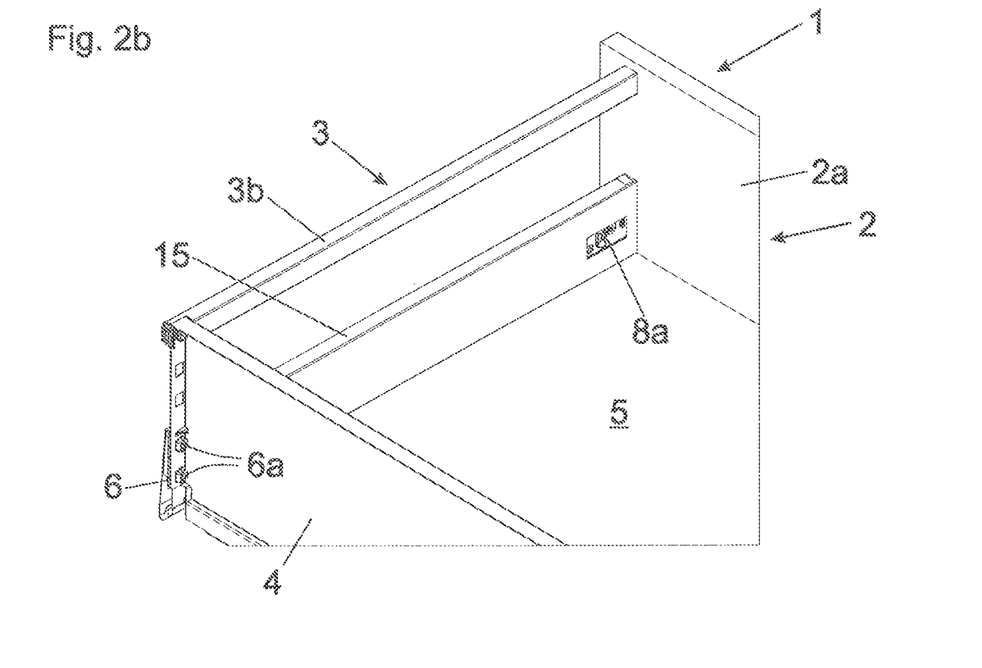

FIG. 2a shows a partial section of a second drawer 1 having a drawer bottom 5, a first furniture part 2 in the form of a front panel 2a, a lateral drawer wall 15 and a rear wall 4. The drawer wall 15 can have a height less than a half of a height of the drawer wall 3a shown in FIG. 1b. Again, the drawer wall 15 is configured as a hollow-chamber profile having an inner profiled wall and an outer profiled wall, and includes a rear wall retainer 6 with protrusions 6a engaging in corresponding openings 16 (FIG. 3a) of the rear wall 4 in the mounted condition. The drawer wall 15 includes—as shown in FIGS. 1a, 1b—a first fastening device 8a configured to be releasably locked to a holding portion 7 to be fixed to the front panel 2a. The connecting pin 9 is to be mounted to the rear side of the front panel 2a, the connecting pin 9 being configured to be connected to a second furniture part 3, in this case to a drawer strut 3b arranged above the drawer wall 15. The mounted position of the drawer strut 3b is shown in FIG. 2b. Accordingly, the one and the same connecting pin 9 can be connected to the drawer wall 3a shown in FIG. 1b as well as to the drawer strut 3b shown in FIG. 2b.

Figure 3A:
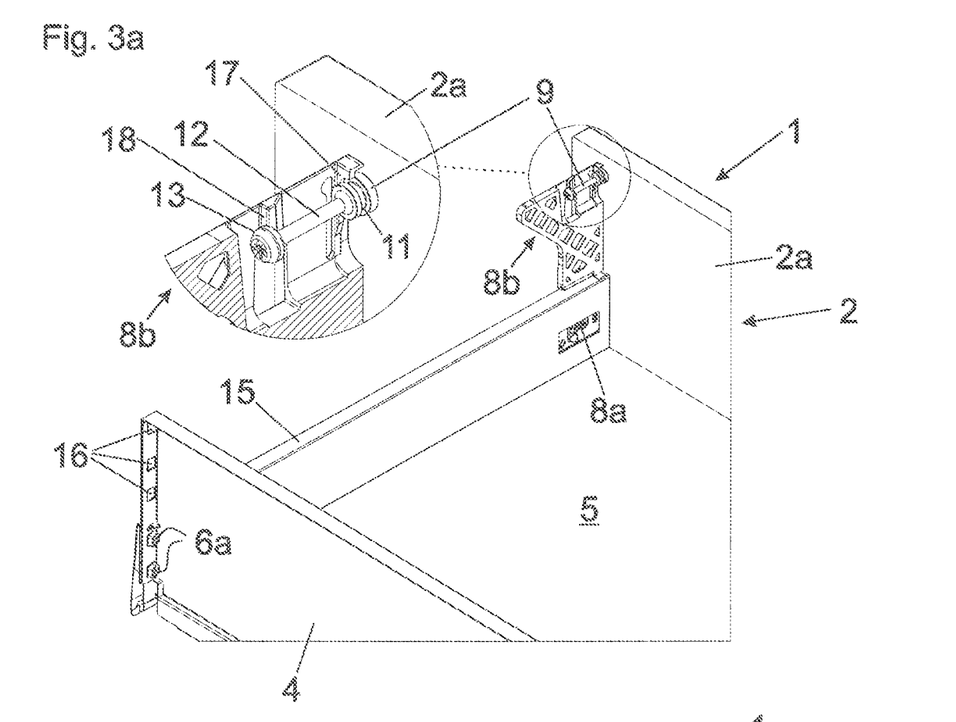
FIGS. 3a, 3b show a partial section of a third drawer in in two perspective views from above.
Figure 3B:
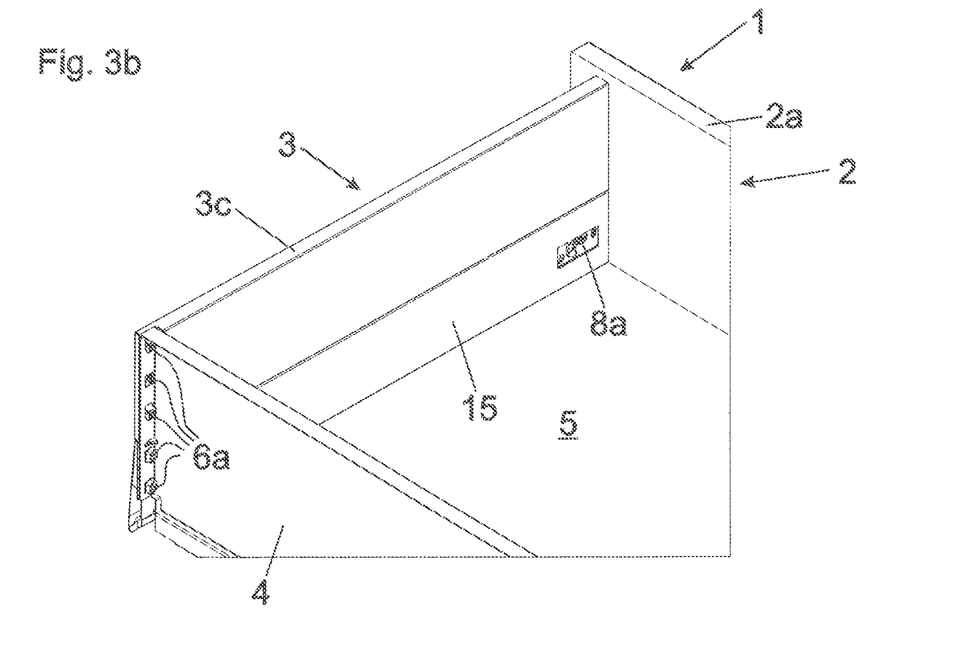

FIG. 3a shows a third drawer 1 having a drawer bottom 5, the rear wall 4, the front panel 2a and a drawer wall 15 configured as a hollow-chamber profile. The drawer wall 15 can have an identical height as the lower drawer wall 15 according to FIGS. 2a, 2b. The drawer wall 15, in a front-end region, has a first fastening device 8a for releasably locking the holding portion 7 (FIG. 1a) to be fixed to the front panel 2a. In this embodiment, the second furniture part 3 is formed by a wall element 3c which is set onto the lateral drawer wall 15, optionally by the formation of a gap. The wall element 3c can be configured as a hollow-chamber profile having an inner and an outer profiled wall. In FIG. 3a, only the second fastening device 8b is shown from the wall element 3c. In order to mount the wall element 3c, a front end of the wall element 3c is initially pushed onto the connecting pin 9 and, subsequently, is set onto the drawer wall 15 by applying a vertical downward movement, and a counter-contour 17 of the wall element 3c can be introduced in the connecting portion 11 of the connecting pin 9. In this way, the wall element 3c, in the mounted position, can be connected to the connecting pin 9 in a form-locking manner. The wall element 3c further includes at least one counterstop 18 configured to rest against an underside of the head portion 13 in the mounted position, and the counterstop 18 locks the wall element 3c in the longitudinal direction in a force-locking manner. FIG. 3b shows the wall element 3c mounted to the drawer 1, and the upper side of the wall element 3c is arranged flush with the upper side of the rear wall 4.

FIG. 4 shows a view of different second furniture parts 3 in the form of the drawer wall 3a having a large height, the drawer strut 3b arranged above the lower drawer wall 15, and the wall element 3c set onto the lower drawer wall 15. Each of the drawer wall 3a having the large height and each of the two drawer walls 15 having the lower height, in a front-end region, has a first fastening device 8a configured to be releasably locked to the holding portion 7 (FIG. 1a) to be fixed to the front panel 2a. Each of the first fastening devices 8a is arranged close to a bottom (i.e. in a position adjacent to the drawer bottom 5). Above these first fastening devices 8a, second fastening devices 8b are arranged, and each of the second fastening devices 8b is configured to be locked to four different types of connecting pins 9 in a form-locking and/or in a force-locking manner.

The first (top) of the four depicted connecting pins 9 includes a head portion 13, a neck portion 12, a connecting portion 11 and a fastening portion 19 in the form of a dowel 20. The dowel 20, together with the holding portion 10 (FIG. 1a), has a one-piece configuration. The dowel 20 can thereby be pressed into a bore 26 of the first furniture part 2.

In a second embodiment of the connecting pin 9, the fastening portion 19 includes a threaded portion 21 configured to be screwed into the first furniture part 2 in order for the connecting pin 9 to be fixed.

In a third embodiment of the connecting pin 9, the dowel 20 is pivotally connected to the holding portion 10 (FIG. 1a) by a hinge axis member 22. The connecting pin 9 includes an expansion portion 23 for expanding the dowel 20, and the expansion portion 23 can be moved about the hinge axis member 22 by a pivoting movement of the holding portion 10, so that the dowel 20 can be moved into an expansion position. As a result, the dowel 20 can be fixed within the bore 26 of the first furniture part 2. Such a functionality of an expandable dowel 20 is shown, for example, in EP 0 698 357 A1 to the applicant.

In a fourth embodiment of the connecting pin 9, the head portion 13 is configured to be releasably connected to the fastening portion 19, preferably by a snap-connection device 24. Instead of a dowel 20 or a threaded portion 21, the connecting pin 9 can also be fixed to a front panel 2a (for example of an inner drawer) by a pivotable lever 25. In the mounted position of the connecting pin 9, the lever 25 engages into the connecting portion 11 and thereby fixes the connecting pin 9 in a form-locking manner.

The drawer set according to the invention thus includes at least two of the following three different second furniture parts 3, namely:

a first drawer wall 3a having a first fastening device 8a for fixing a front panel 2a and at least one second fastening device 8b for fixing the front panel 2a, a second drawer wall 15 having a height being less than a height of the first drawer wall 3a, the second drawer wall 15 having a first fastening device 8a for fixing a front panel 2a and a drawer strut 3b arranged above the second drawer wall 15 in the mounted condition, the drawer strut 2b having a second fastening device 8b for fixing the front panel 2a, a third drawer wall 15 having a height being less than a height of the first drawer wall 3a, wherein a wall element 3c is set onto the third drawer wall 15, the third drawer wall 15 having a first fastening device 8a for fixing a front panel 2a and the wall element 3c having a second fastening device 8b for fixing to the front panel 2a, and a connecting pin 9 to be fixed to a front panel 2a, the connecting pin 9 having at least one holding portion 10, wherein the same holding portion 10 of the connecting pin 9 can be alternatively connected to the second fastening device 8b of at least two of the three different second furniture parts 3.

Figure 5:
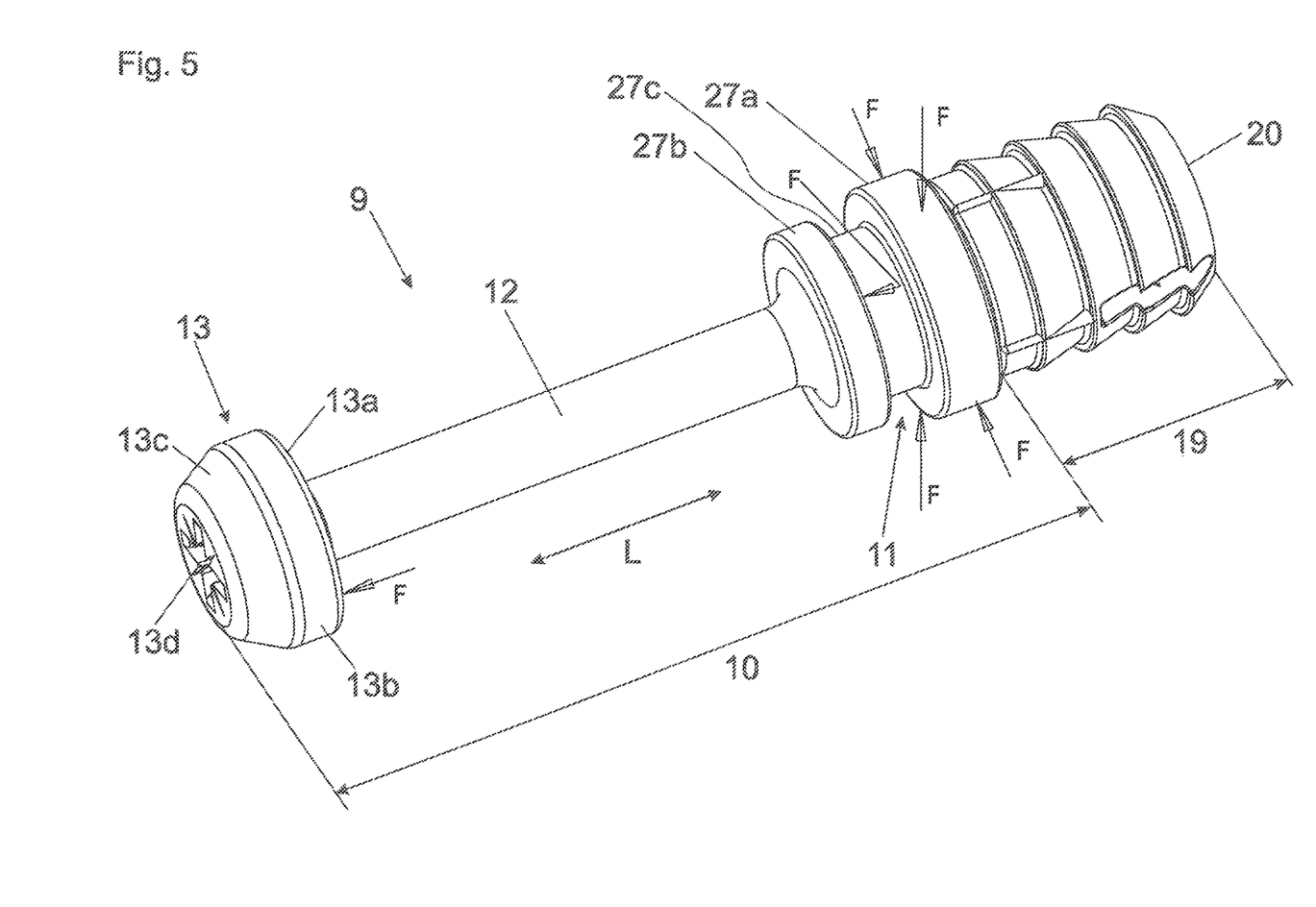
FIG. 5 shows an embodiment of a connecting pin in a perspective view.

FIG. 5 shows an embodiment of a connecting pin 9 in a perspective view. The connecting pin 9 includes a fastening portion 19, for example with a dowel 20, to be connected to the first furniture part 2. The holding portion 10 is configured to be connected to the second furniture part 3 and includes a connecting portion 11 for connecting the second furniture part 3 to the connecting pin 9 in a form-locking manner, and a head portion 13 spaced along a longitudinal direction (L) from the connecting portion 11 by a neck portion 12. At least two different second furniture parts 3 are configured to be alternatively connected to the connecting pin 9 by the connection portion 11 in a form-locking manner and/or by the head portion 13 in a force-locking manner. The connecting portion 11 includes a first protrusion 27a, preferably in the form of a limb, and at least one second protrusion 27b, preferably in the form of a limb. Each of the first protrusion 27a and the second protrusion 27b protrudes transversely (radially) from the connecting pin 9 with respect to the longitudinal direction and are spaced from one another along the longitudinal direction (L) of the connecting pin 9 by a recess 27c, for example in the form of a cylindrical portion. The first protrusion 27a and/or the second protrusion 27b and/or the cylindrical portion 27c and/or the head portion 13 are configured so as to be rotationally symmetrical about the longitudinal direction (L), whereby the connecting pin 9 can be very easily fabricated. The cylindrical portion 27c can have a smaller diameter than the first protrusion 27a and the second protrusion 27b. The first protrusion 27a and/or the second protrusion 27b can be configured as an annular limb, and the recess (cylindrical portion) 27c can be configured as an annular groove. The first protrusion 27a fixes the second furniture part 3 in a direction transverse to the longitudinal direction (L), while the second furniture part 3 is fixed relative to the connecting pin 9 in the longitudinal direction (L) by the recess (cylindrical portion) 27c.

The head portion 13 for connecting to the second furniture part 3 in a force-locking manner has a greater diameter than the neck portion 12, an abutment surface 13a preferably extending at a right angle to longitudinal direction (L), a ring-shaped portion 13b and an inclined surface portion 13c extending to the tip of the head portion 13. Moreover, the head portion 13 can be provided with a tool receiving device 13d. By rotating the tool receiving device 13d with the aid of a tool, a threaded portion 21 (if present) of the connecting pin 9 can be screwed into the first furniture part 2. Each of the arrows (F) depicted in FIG. 5 indicates the regions of the holding portion 10 to which the force-locking connection and the form-locking connection are operative.

Figure 6A:
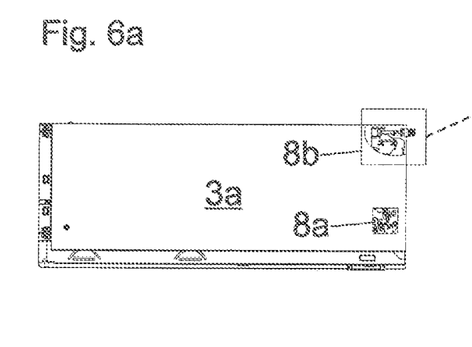
FIGS. 6a-6f show the three different furniture parts in the form of the drawer wall, the drawer strut and the wall element with the connecting pin locked therewith.
Figure 6B:
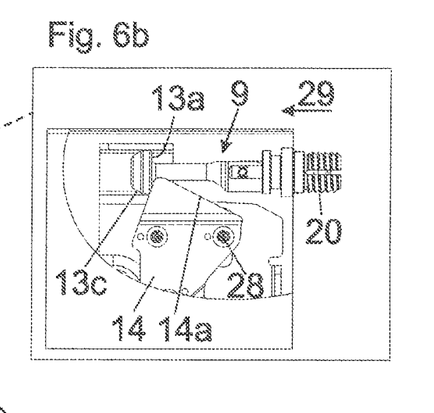

FIG. 6a shows the drawer wall 3a having a large height, the side wall 3a having two fastening devices 8a, 8b spaced from one another in a height direction. The second (upper) fastening device 8b is configured to be releasably locked to the connecting pin 9. FIG. 6b shows an enlarged detail view of the second fastening device 8b according to FIG. 6a, the second fastening device 8b including at least one resilient or a spring-loaded locking element 14 configured to be releasably connected, preferably locked, to the holding portion 10 of the connecting pin 9. The connecting pin 9 can be introduced into the second fastening device 8b in an insertion direction 29, and the locking element 14 can be configured to be moved against its resilient action in a direction transverse to the insertion direction 29 by an entry of the connecting pin 9 into the second fastening device 8b. Upon a continued movement in the insertion direction 29, the connecting pin 9 can be automatically locked by the resilient action of the locking element 14. In the shown embodiment according to FIG. 6b, the locking element 14 is pivotally mounted about the pivoting axis 28 and is pre-stressed by a spring element (not shown). Upon introducing the connecting pin 9, an inclined surface portion 14a of the locking element 14 cooperates with the inclined surface portion 13c of the head portion 13, whereby the locking element 14 is tilted in a counterclockwise direction about the pivoting axis 28, and the connecting pin 9 can be locked by a subsequent snapping back action of the locking element 14 (resilient movement due to the spring force). In the locked position, the locking element 14 rests against the abutment surface 13a of the head portion 13, whereby the connecting pin 9 is fixed in a force-locking manner.

Figure 6C:
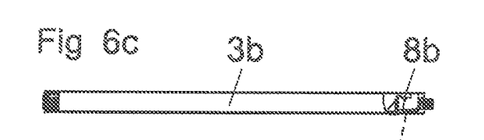
Figure 6D:
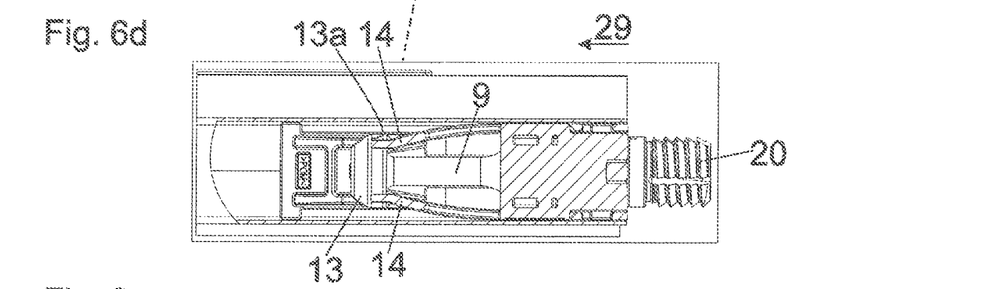

FIG. 6c shows the drawer strut 3b having a second fastening device 8b in the front end region, and the second fastening device 8b is configured to be fixed to the connecting pin 9. In FIG. 6d, the second fastening device 8b is shown in an enlarged view. In the shown embodiment, the locking element 14 includes two spring tongues configured to be elastically deformable against their resilient action in a direction transverse to the insertion direction 29 upon introducing the connecting pin 9 into the second fastening device 8b. By a continued movement of the connecting pin 9 in the insertion direction 29, the spring tongues snap back due to elastic spring force and thereby fix the connecting pin 9 in a force-locking manner. In the shown mounting position, the free end portions of the spring tongues rest against the abutment surface 13a of the head portion 13.

Figure 6E:
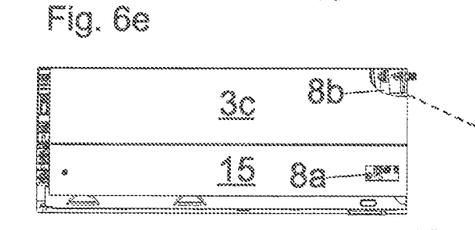
Figure 6F:
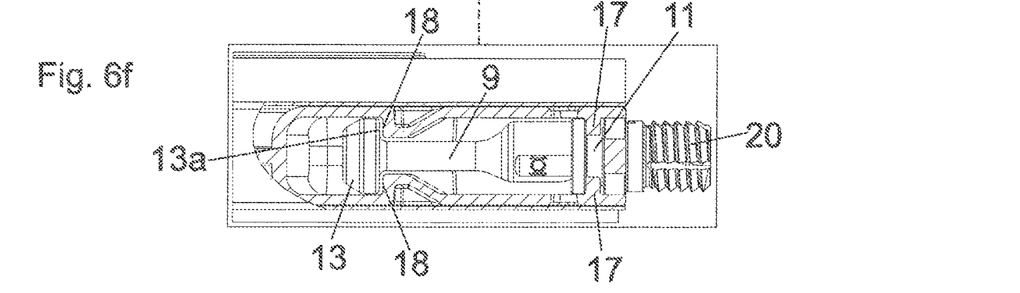
Figure 7A:
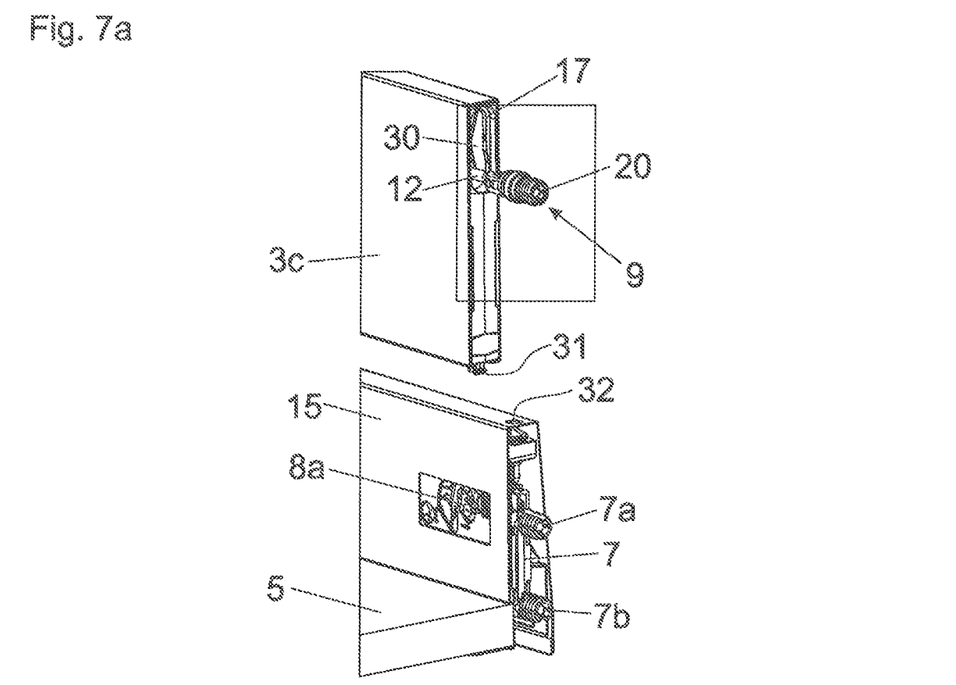
FIGS. 7a-7d show the front-end portion of a lower drawer wall and the wall element configured to be disposed thereon, and the mounting operation of the wall element in temporal sequences.
Figure 7B:
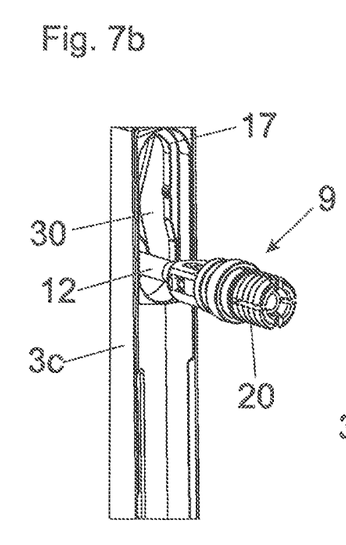
Figure 7C:
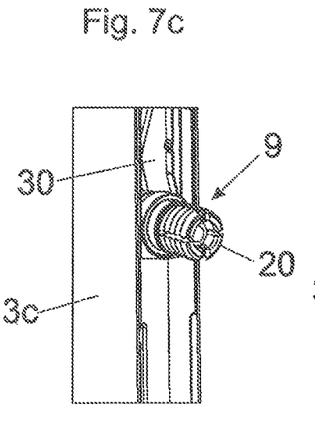
Figure 7D:
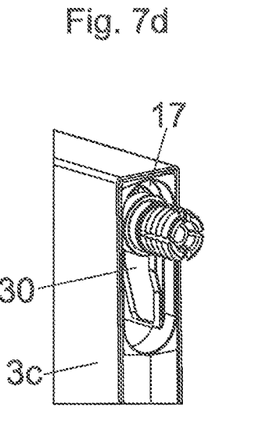

FIG. 6e shows the wall element 3c being set onto the drawer wall 15, the wall element 3c having a second fastening device 8b in the front-end region. FIG. 6f shows the second fastening device 8b in an enlarged view. In contrast to the embodiments according to FIGS. 6a-6d, a front end of the wall element 3c is hereby pushed onto the connecting pin 9. Subsequently, the wall element 3c is pushed from above (i.e. by a downwardly directed vertical movement of the wall element 3c in a direction of the drawer wall 15) onto the holding portion 10 of the connecting pin 9. A counter-contour 17 of the wall element 3c can be introduced into the connection portion 11 of the connecting pin 9 and, as a result, the form-locking connection between the wall element 3c and the connecting pin 9 can be established. The counterstops 18 (see also FIG. 3a) can rest against the abutment surface 13a of the head portion 13, or, if appropriate, can be slightly spaced from the abutment surface 13a. For example, if a person applies a jerky pulling force to the front panel 2a of the drawer 1, the abutment surface 13a of the connecting pin 9 hits against the counterstops 18 of the wall element 3c. As a result, a slipping-out movement of the connecting pin 9 from the second fastening device 8b can be prevented in such an overload case. FIG. 7a shows the front-end region of a lower drawer wall 15 and the wall element 3c to be arranged thereon. The first (lower) fastening device 8a of the drawer wall 15 is configured to be locked to the holding portion 7 to be fixed to the rear side of the front panel 2a, and the holding portion 7 includes two fastening dowels 7a, 7b spaced from each other in a height direction. Arranged on the upper side of the drawer wall 15 is an opening 32 into which the wall element 3c can be engaged via a hook portion 31. The wall element 3c has a front face with a keyhole 30, and the slightly inclined wall element 3c can be pushed onto the pre-mounted connecting pin 9 by the provision of the keyhole 30. The mounting procedure of the wall element 3c is shown in FIGS. 7b-7d. After the wall element 3c has been pushed onto the connecting pin 9 (FIG. 7b, 7c), the wall element 3c is displaced along the keyhole 30 by applying a manual force in a downward direction. The keyhole 30 is shaped to be upwardly tapered, until a counter contour 17 of the wall element 3c engages into the connection portion 11 of the connecting pin 9 and the form-locking connection is established.

The invention claimed is:

1. A connecting pin for fastening a first furniture part to a second furniture part, comprising:
   a fastening portion for fastening the connecting pin to the first furniture part,
   a holding portion for connecting the connecting pin to the second furniture part,
   wherein the holding portion of the connecting pin includes:
      a connecting portion facing towards the fastening portion, the connecting portion being configured to connect the second furniture part to the connecting pin in a form-locking manner, the connecting portion including a first protrusion and a second protrusion, the first protrusion and the second protrusion each protruding transversely from the connecting pin with respect to a longitudinal direction of the connecting pin and being spaced from one another along the longitudinal direction of the connecting pin by a recess therebetween;
      a neck portion; and
      a head portion spaced from the connecting portion along a longitudinal direction of the connecting pin by the neck portion,
   wherein the connecting pin is configured such that, when the connecting pin is fixed to the first furniture part via the fastening portion, at least two different second furniture parts can be alternatively connected to the connecting pin by the connecting portion in a form-locking manner and/or by the head portion in a force-locking manner.

2. The connecting pin according to claim 1, wherein the fastening portion includes a threaded portion for fixing the connecting pin to the first furniture part.

3. The connecting pin according to claim 1, wherein the fastening portion includes a dowel for fixing the connecting pin to the first furniture part.

4. The connecting pin according to claim 3, wherein the dowel is pivotally connected to the holding portion by a hinge axis member, the connecting pin includes an expansion portion for expanding the dowel, and the expansion portion is configured to be moved by a pivoting movement of the holding portion about the hinge axis member so that the dowel is movable into an expansion position to thereby be fixed within a bore of the first furniture part.

5. The connecting pin according to claim 3, wherein the dowel and the holding portion are formed together to have a one-piece configuration.

6. The connecting pin according to claim 1, wherein the head portion is configured to be releasably connected to the fastening portion.

7. The connecting pin according to claim 6, wherein the head portion is configured to be releasably connected to the fastening portion by a snap-connection device.

8. The connecting pin according to claim 1, wherein each of the first protrusion and the second protrusion is formed as a limb, and the recess is formed as a cylindrical portion.

9. The connecting pin according to claim 1, wherein at least one of the first protrusion, the second protrusion, the recess, and the head portion is configured so as to be rotationally symmetrical about the longitudinal direction of the connecting pin.

10. The connecting pin according to claim 1, wherein the recess has a diameter less than a diameter of each of the first protrusion and the second protrusion.

11. The connecting pin according to claim 1, wherein at least one of the first protrusion and the second protrusion is configured as an annular limb, and the recess is configured as an annular groove.

12. The connecting pin according to claim 1, wherein a diameter of the head portion is larger than a diameter of the neck portion.

13. An arrangement comprising:
    a first furniture part formed as a front panel;
    at least one from a group including a second furniture part formed as a drawer wall, a drawer strut, and a wall element set onto a drawer wall, and
    a connecting pin including:
       a fastening portion for fastening the connecting pin to the first furniture part,
       a holding portion for connecting the connecting pin to at least one of the drawer wall, the drawer strut, and the wall element,
       wherein the holding portion of the connecting pin includes:
          a connecting portion facing towards the fastening portion, the connecting portion being at least one of a protrusion and a recess for alternatively connecting the connecting pin to the at least one of the drawer wall, the drawer strut, and the wall element in a form-locking manner;
          a neck portion; and
          a head portion spaced from the connecting portion along a longitudinal direction of the connecting pin by the neck portion,
       wherein the connecting pin is configured such that, when the connecting pin is fixed to the first furniture part via the fastening portion, the connecting pin is connectable to the at least one of the drawer wall, the drawer strut, and the wall element by (i) the connecting portion in a form-locking manner and/or by (ii) the head portion in a force-locking manner,
    wherein the connecting pin is configured to alternatively connect the at least one of the drawer wall, the drawer strut and the wall element to the front panel, and
    wherein the at least one of the drawer wall, the drawer strut, and the wall element includes a second fastening device for fixing to the front panel, the second fastening device including a resilient or a spring-loaded locking element configured to be releasably connected to the holding portion of the connecting pin.

14. The arrangement according to claim 13, wherein the connecting pin is configured to be introduced into the second fastening device in an insertion direction, the locking element being configured so as to be movable against a resilient biasing force of the locking element in a direction transverse to the insertion direction by an entry of the connecting pin into the second fastening device, and the connecting pin is configured to be automatically locked by the resilient biasing force of the locking element by a continued movement of the connecting pin in the insertion direction.

15. The arrangement according to claim 13, wherein the resilient or the spring-loaded locking element is configured to be releasably locked to the holding portion of the connecting pin.

16. A drawer set comprising:
    a first furniture part formed as a front panel;
    at least two of the following three different second furniture parts:
       (i) a first drawer wall having a first fastening device for fixing to the front panel and at least one second fastening device for fixing to the front panel, (ii) a second drawer wall having a height less than a height of the first drawer wall, the second drawer wall including a first fastening device for fixing to the front panel, and a drawer strut to be fixed to the front panel, the drawer strut being arranged above the second drawer wall, and the drawer strut including a second fastening device for fixing to the front panel, (iii) a third drawer wall having a height less than a height of the first drawer wall, and a wall element to be set onto the third drawer wall, the third drawer wall having a first fastening device for fixing to a front panel, and the wall element having a second fastening device for fixing to the front panel; and a connecting pin including:

a fastening portion for fastening the connecting pin to the front panel, a holding portion for connecting the connecting pin to one of the second furniture parts, wherein the holding portion of the connecting pin includes:

a connecting portion facing towards the fastening portion, the connecting portion being configured to alternatively connect the at least two of the three different second furniture parts to the connecting pin in a form-locking manner, the connecting portion including a first protrusion and a second protrusion, the first protrusion and the second protrusion each protruding transversely from the connecting pin with respect to a longitudinal direction of the connecting pin and being spaced from one another along the longitudinal direction of the connecting pin by a recess therebetween;

a neck portion; and a head portion spaced from the connecting portion along a longitudinal direction of the connecting pin by the neck portion, wherein the connecting pin is configured such that, when the connecting pin is fixed to the front panel via the fastening portion, the at least two of the three different second furniture parts can be alternatively connected to the connecting pin by the connecting portion in a form-locking manner and/or by the head portion in a force-locking manner, wherein the holding portion of the connecting pin can be alternatively connected to the second fastening device of the at least two of the three different second furniture parts.

17. A drawer set comprising:

a first furniture part formed as a front panel;

at least two of the following three different second furniture parts:

(i) a first drawer wall having a first fastening device for fixing to the front panel and at least one second fastening device for fixing to the front panel, (ii) a second drawer wall having a height less than a height of the first drawer wall, the second drawer wall including a first fastening device for fixing to the front panel, and a drawer strut to be fixed to the front panel, the drawer strut being arranged above the second drawer wall, and the drawer strut including a second fastening device for fixing to the front panel, (iii) a third drawer wall having a height less than a height of the first drawer wall, and a wall element to be set onto the third drawer wall, the third drawer wall having a first fastening device for fixing to a front panel, and the wall element having a second fastening device for fixing to the front panel; and a connecting pin including:

a fastening portion for fastening the connecting pin to the front panel, a holding portion for connecting the connecting pin to one of the second furniture parts, wherein the holding portion of the connecting pin includes:

a connecting portion facing towards the fastening portion, the connecting portion being at least one of a protrusion and a recess configured to alternatively connect the at least two of the three different second furniture parts to the connecting pin in a form-locking manner;

a neck portion; and a head portion spaced from the connecting portion along a longitudinal direction of the connecting pin by the neck portion, wherein the connecting pin is configured such that, when the connecting pin is fixed to the front panel via the fastening portion, the at least two of the three different second furniture parts can be alternatively connected to the connecting pin by the connecting portion in a form-locking manner and/or by the head portion in a force-locking manner, wherein the holding portion of the connecting pin can be alternatively connected to the second fastening device of the at least two of the three different second furniture parts, and wherein each of the at least two of the three different second furniture parts includes a second fastening device for fixing to the front panel, the second fastening device including a resilient or a spring-loaded locking element configured to be releasably connected to the holding portion of the connecting pin.

* * * * *